Feb. 27, 1968
R. S. PETERSON
3,370,600
CENTRIFUGAL GOVERNOR FOR DUAL CONTROL OF A
SERVO-MOTOR AND A HYDRAULIC SWITCH
Filed Sept. 9, 1965
3 Sheets-Sheet 1
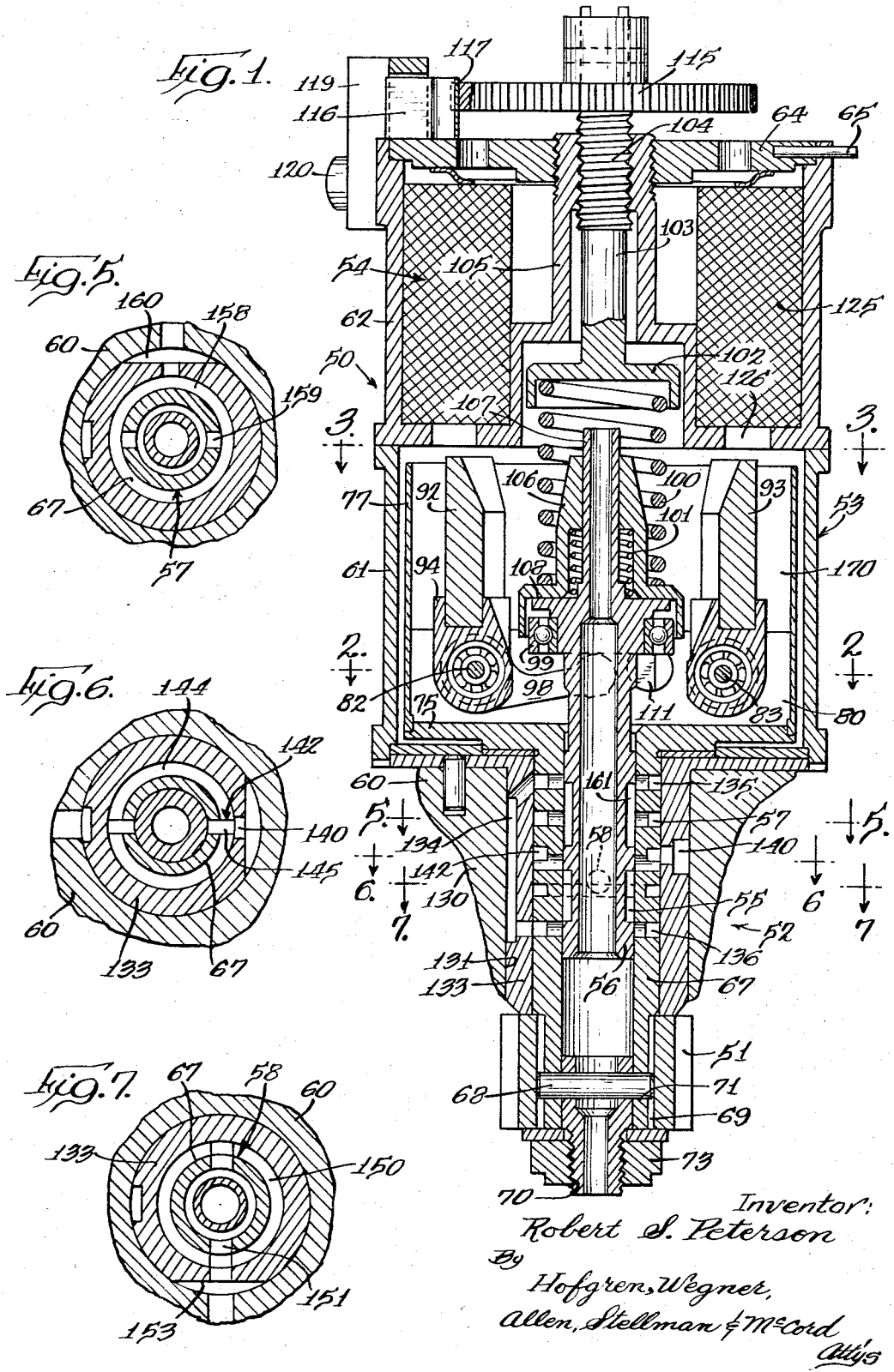
Inventor:
Robert S. Peterson
By Hofgren, Wegner,
Allen, Stellman & McCord
Atty's

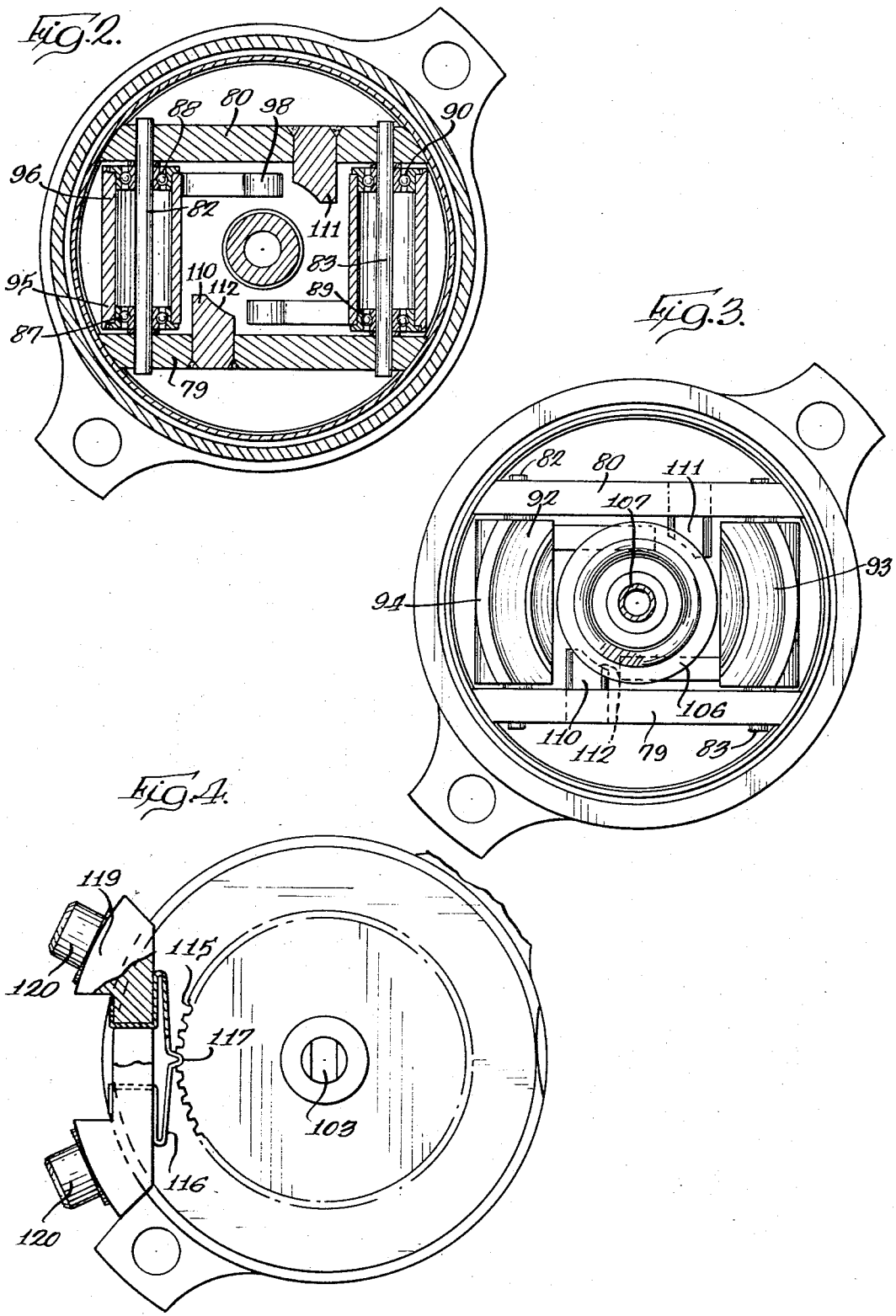

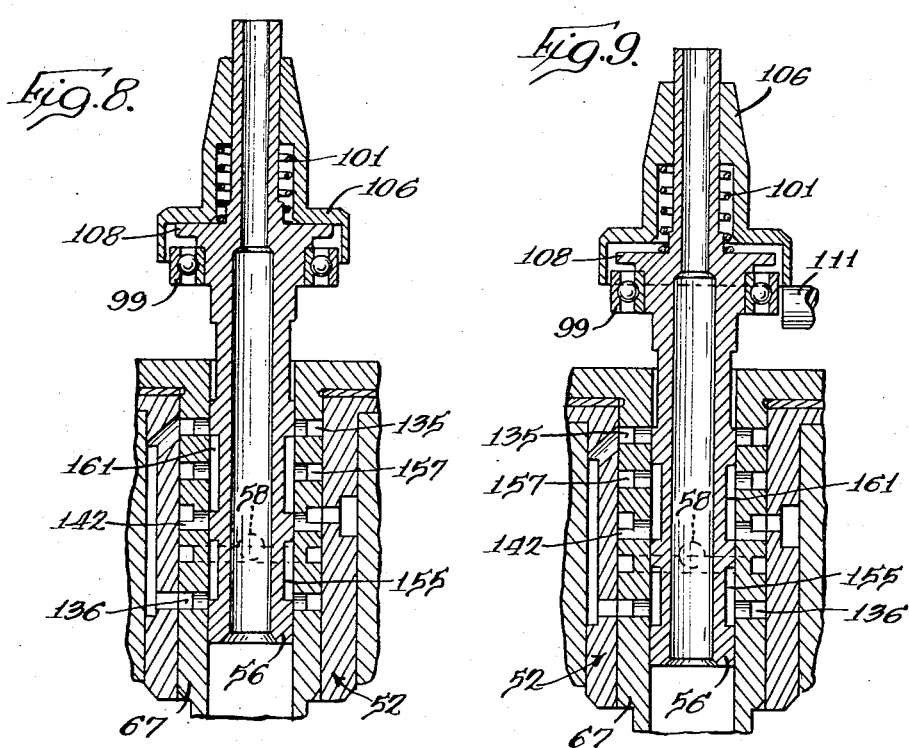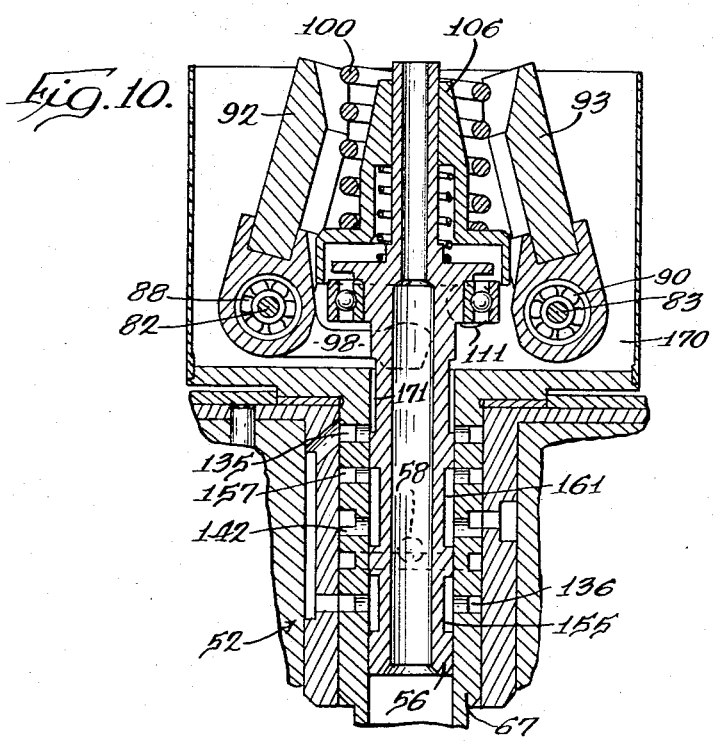

United States Patent Office 3,370,600
Patented Feb. 27, 1968

3,370,600
CENTRIFUGAL GOVERNOR FOR DUAL CONTROL OF A SERVO-MOTOR AND A HYDRAULIC SWITCH
Robert S. Peterson, Cherry Valley, Ill., assignor to Sundstrand Corporation, a corporation of Illinois
Filed Sept. 9, 1965, Ser. No. 486,090
10 Claims. (Cl. 137—54)

This invention relates generally to a governor assembly, and more particularly to fluid governor valve assembly for controlling the speed of a drive and the load on the drive.

Hydraulic drives are conventionally employed for rotating alternators at a constant speed to provide a stable electrical output for an electrical system where the hydraulic drives are driven by variable speed prime movers such as aircraft engines. To maintain a constant output speed from the hydraulic drive, one or more servo-motors are usually provided for varying the displacement of one or more hydraulic drive units to change the ratio of input speed to output speed. In the past, flyweight governors have been provided for controlling the servo-motor through a main governor valve to maintain a constant output speed from the transmission.

Oftentimes, several transmissions and alternators are arranged in parallel with the output of the alternators connected to a common electrical bus. In such cases it is desirable to disconnect an alternator from the bus when the output speed of the associated transmission falls below a normal operating speed range to prevent motoring of the alternator from the electrical bus. For this purpose, a governor valve assembly separate from the main drive governor has been associated with each drive for disconnecting the alternator from the bus at predetermined low transmission output speed, due, for example, to abnormally low input speed. It is also desirable to disconnect the alternator from the electrical bus when a failure occurs in the governor drive mechanism.

Another function to be performed by the governor means is to reduce the output to input ratio of the fluid transmission to minimum when a failure occurs in the governor drive mechanism thereby to prevent overspeeding and runaway. For this purpose, in some systems the governor exercises control and reduces the transmission ratio thereby preventing damage to the transmission components which would occur if the transmission were permitted to overspeed to destruction.

A system such as that described above is shown in U.S. Letters Patent 2,931,177 to Teumer dated April 5, 1960, but it has the disadvantage of requiring two governors.

Other systems, as in U.S. Letters Patent 2,888,806 to Teumer dated June 2, 1959, provide with one governor, the basic governing function, an underspeed signal for removing an alternator from the electrical bus, and a failsafe control in event of failure of the governor drive mechanism, but the latter functions occur at once either at a speed too low for the former or at a speed too high for the latter.

It is in this background that applicant has provided a single governor including a flyweight and valve assembly which performs the basic governing function and additionally provides an underspeed signal first to remove the alternator from the bus bar at a predetermined sensed underspeed and then a failsafe function to reduce the transmission ratio to minimum at a still lower speed as in event of governor drive failure.

The present governor valve has in effect four control positions. The first is operative in the normal speed range of the prime mover and is effective to port fluid to and from a servo control port connected to control a servo-motor which increases and decreases the fluid transmission ratio to maintain a constant output speed from a transmission of the type described above. When the governor flyweight assembly senses a speed indicating that the input speed is substantially below the rated minimum normal speed range, or if a failure occurs in the governor drive, the governor valve moves to a second or underspeed position where the valve is effective to drain fluid from a port adapted to be connected to a pressure switch which disconnects an alternator, which is the load from its associated electrical bus in a transmission of the type described above. Upon a further reduction in speed sensed by the flyweight assembly, the present governor valve moves to a third position, which may be termed a failsafe position, in which it is effective to continue draining fluid from the pressure switch and also to connect the servomotor port to drain which reduces the ratio of fluid transmission to prevent damage to the transmission components. The governor valve assumes a fourth position which may be termed a shutdown position when the associated transmission ceases to rotate. In this position, the governor valve maintains the pressure switch port and the servomotor control port in full communication with drain and also ports control fluid to the flyweight assembly to reduce the time delay of the governor on start-up.

It is, therefore, a general object of the present invention to provide a new and improved governor for controlling fluid flow having a flyweight assembly connected to actuate a multiple port valve and selectively connect first and second control ports to either a fluid pressure port or a drain port wherein the valve is movable to a first position range where the second control port is selectively connected to the fluid pressure port or the drain port and the first control port is in full communication with the fluid pressure port, and movable to a second position in which the first control port and the second control port are in full communication with the drain port.

Another object of the present invention is to provide a new and improved governor for controlling fluid flow to a transmission ratio servomotor and a load disconnecting pressure switch in an alternator drive having a flyweight assembly connected to move a valve member to a governing position in a predetermined normal speed range of the drive in which a transmission servomotor port is selectively connected to a fluid pressure port and a drain port, and a pressure switch port is connected to the fluid pressure port to connect the load to the drive, and in which the flyweight assembly moves the valve to a failsafe position at a predetermined speed below the normal speed range to connect the servomotor port and the pressure switch port to drain for reducing the output of the drive and disconnecting the load from the drive.

A further object of the present invention is to provide a new and improved governor of the type described above having a third or underspeed position intermediate the normal governing position and the failsafe position in which the pressure switch port initially communicates with drain so that the associated alternator is removed from the electrical bus at a sensed speed above the failsafe speed.

A still further object of the present invention is to provide a new and improved governor of the type described above in which the governor valve is movable to a fourth or shutdown position in which the servomotor port and the pressure switch port communicate with the drain port and the governor assembly is supplied fluid from the fluid pressure port to reduce the time delay before governing during start-up.

Other objects and advantages of the present invention will become readily apparent from the following detailed description taken in connection with the accompanying drawings in which:

FIG. 1 is a longitudinal sectional view of the present governor assembly shown in the normal governing position;

FIG. 2 is a cross section taken generally along line 2—2 of FIG. 1 showing the flyweight mounting in the governor assembly;

FIG. 3 is a cross section taken generally along line 3—3 of FIG. 1 showing the flyweight assembly;

FIG. 4 is a plan view, partially in cross section, of the governor assembly shown in FIG. 1;

FIG. 5 is a cross section taken generally along line 5—5 of FIG. 1 showing the pressure switch ports in the governor valve;

FIG. 6 is a cross section taken generally along line 6—6 of FIG. 1 showing the drain ports in the governor valve;

FIG. 7 is a cross section taken generally along line 7—7 of FIG. 1 showing the servomotor control ports in the governor valve;

FIG. 8 is a fragmentary longitudinal section of the governor valve in its underspeed position;

FIG. 9 is a fragmentary longitudinal section of the governor valve in its failsafe position; and FIG. 10 is a fragmentary longitudinal section of the governor valve in its shutdown position.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Referring to FIG. 1, a governor assembly generally designated by the numeral 50 is seen to consist generally of a drive gear 51, a hydraulic valve 52, a flyweight assembly 53, and an electromagnetic trim assembly 54. The governor drive gear 51 is adapted to be driven by the output shaft of a transmission similar to that described above and disclosed in the Teumer Patent 2,931,177, so that the governor assembly 50 is adapted to sense the output speed of the transmission. Drive gear 51 is connected to rotate the flyweight assembly 53 and the flyweight assembly in turn positions a slidable spool valve member 56 in the valve 52 to selectively control the flow of fluid to and from a pressure switch port 57 and a servomotor port 58. The pressure switch port 57 may be connected to a pressure switch controlling the electrical connection of an alternator to a bus in a manner similar to that shown in Teumer 2,931,177. The servomotor control port 58 may be connected to a suitable servo controlling the drive ratio of an alternator drive of the type which, when fluid is ported to the servo, will increase the drive ratio and output speed of the transmission, and when fluid is ported from the servo, will decrease the output speed of the transmission. Such servo mechanisms are well known to those skilled in this art.

The governor assembly 50 is enclosed by a stationary support member 60 surrounding the hydraulic valve 52, a stationary cylindrical lower housing member 61 surrounding the flyweight assembly 53, and a stationary cylindrical upper housing member 62 fixed to the lower housing member 61 and surrounding the electromagnetic trim assembly 54. A cover 64 closes the upper end of housing member 62 and is fixed thereto by suitable pins 65.

As noted above, the flyweight assembly 53 is rotated by the input gear 51. Rotational motion is transferred from the input gear 51 to the flyweight assembly 53 through a rotary sleeve valve member 67 which is a portion of the hydraulic valve 52. Input gear 51 is fixed to the rotary sleeve member 67 by pin 68 which extends through diametral holes in the lower end of the valve member 67 with its ends engaged in pin receiving slots 69 in the gear 51. Pin 68 is retained in place by a hollow shouldered pin 70 mounted within the sleeve valve member 67 and having diametral holes 71 which engage the pin 68. A lock nut 73 threadably engaging the lower end of hollow pin 70 draws the pin downwardly locking it in position. On the upper end of the rotary sleeve valve member 67 is an annular flange 75 which drives the flyweight assembly 53.

The flyweight assembly 53 has a rotary cylindrical housing member 77 fixed to the periphery of annular flange 75 and adapted to be driven in rotation thereby. As seen more clearly in FIG. 2, two spaced supporting bars 79 and 80 are fixed in the rotary housing member 77 adjacent the lower end thereof. Two parallel flyweight shafts 82 and 83 are supported at their ends in the support bars 79 and 80 and are fixed with respect thereto. The shafts 82 and 83 receive bearings 87, 88 and 89, 90 respectively. The flyweight assembly 53 has two flyweights 92 and 93 rotatably supported on shafts 82 and 83, respectively. As these flyweights and the associated supporting structure are identical, the details thereof will be described only with reference to flyweight 92.

Referring to FIGS. 1–3, a flyweight holder 94 is provided which has a generally U-shaped configuration with legs 95 and 96 supported on the outer races of bearings 87 and 88, respectively. The upper surface of holder 94 has an arcuate groove therein which receives and fixedly mounts the flyweight 92 therein. Extending from one side of leg 96 is a valve actuating arm 98 adapted to engage the outer race of a ball bearing 99 mounted on an enlarged portion of the spool valve stem 56. As the flyweights 92 and 93 pivot outwardly, their respective actuating arms 98 move bearing 99 and spool valve member 56 upwardly.

The flyweights 92 and 93 have a generally arcuate shape and are constructed of a ferromagnetic material so that they may be controlled by the electromagnet trim assembly 54.

Flyweights 92 and 93 move spool valve member 56 upwardly and helical compression springs 100 and 101 are provided for urging the valve member downwardly toward a shut-off position. The larger compression spring 100 is received at its upper end by a boss 102 on the lower end of shaft 103 which threadedly engages at 104 a central sleeve 105 formed integrally with the upper housing member 62. The lower end of helical spring 100 reacts against a bell-shaped spring seat 106 slidably mounted on the upper stem portion 107 of the spool valve member 56. The spring seat 106 engages a shoulder 108 on the spool valve member 56 and urges the member downwardly, as seen in FIG. 1. The spring 100 is of sufficient strength to control the movements of the spool valve 56 in the normal operating speed range of the governor assembly and down to a predetermined speed above that which may be termed the failsafe speed.

At a speed above the failsafe speed, the spring 101 takes over and urges the spool valve 56 toward its shutdown position, as shown in FIG. 10. It is desirable to provide a separate spring, such as spring 101, as spring 100, if properly designed to provide normal operating control, is too weak at speeds near the failsafe speed to properly move the spool valve 56 to its shutdown position. Spring 101 is compressed in the normal operating speed range and is seated at its upper end within the spring seat 106 and at its lower end against shoulder 108 on the spool valve 56.

Two cylindrical stops 110 and 111 are fixed within the supporting bars 79 and 80, respectively, and are recessed as at 112 to clear the outer race of bearing 99. The stops 110 and 111 engage and prevent movement of the spring seat 106 below the failsafe position shown in FIG. 9, which is considerably below the normally operating position of the governor valve. As the speed of the flyweight assembly 53 goes below the failsafe speed, the spring 101 expands separating the shoulder 108 from the spring seat 106 and forcing the spool valve 56 to its shutdown position. Spring 101 is, of course, weaker than spring 100.

Provision is made for adjusting the sensitivity of the flyweight assembly 53. For this purpose the shaft 103 is provided with a spur gear 115 fixed to the upper end thereof. A spring detent 116, as shown more clearly in FIG. 4, has a projection 117 which engages the teeth on the spur gear 115. The spring detent 116 is supported by a suitable support member 119 fastened to the upper housing member 62 by suitable studs 120. When the spur gear 115 is rotated, boss 102 moves axially, varying the compression of the main compression spring 100 to thereby vary the speed at which the spool valve 56 responds, as desired.

The flyweight assembly 53 is adjusted so that in the normal operating speed range of the associated prime mover, it will place the hydraulic valve 52 in the position shown in FIG. 1, which is the governing position. At a predetermined transmission input speed below this normal speed range, the governor assembly is designed to place the hydraulic valve 52 in the position shown in FIG. 8 which may be termed the underspeed position of the valve. At a predetermined speed below underspeed, the flyweight assembly 53 places the valve 52 in the failsafe position, shown in FIG 9, and at speeds less than failsafe speeds, the governor assembly moves the valve 52 to the shutdown position shown in FIG. 10.

The electromagnetic trim assembly 54 is provided for varying the effectiveness of the flyweight in situations in which extremely sensitive control is desired. The magnetic forces on the flyweights 92 and 93 provided by the eletcromagnetic trim device 54 are effective to operate either with or against the effect of centrifugal force on the flyweights, and the magnetic forces are usually less than the centrifugal forces exerted upon the flyweights. Because of the fact that magnetic means are used to effect this additional control, it will be clear that an immediate response of the flyweights thereto can be obtained, and thus a control can be produced which is capable of functioning very rapidly. The flyweights 92 and 93 are magnetized so as to have a pole at their upper free end. An annular electromagnet 125 is mounted within the upper housing member 62 and is energized by suitable leads (not shown). A washer 126 mounted within the bottom portion of the upper housing member 62 provides an effective lower face for the electromagnet 125. The core of the electromagnet 125 has a multitude of wire turns wound concentric with the axis of rotation of the flyweights, and by passing a direct electrical current through the magnet coil, a magnetic field is produced. When a current is passed through the coil, the same will act in the nature of a magnet, with one pole at the outer diameter of the coil, and the opposite pole along the inner diameter of the coil. The strength and direction of the direct current fed into the electromagnet 125 will produce varying control effects on the permanently magnetized flyweights, and will either accentuate the centrifugal force to which such flyweights are subjected or counteract such centrifugal force, depending upon the direction in which the current passes through the electromagnet. The intensity of the current will, of course, vary the intensity of the effect. The trimming force exerted on the flyweight by the magnetic forces involved can be applied and modulated with great speed compared to the speed with which the flyweight force can be changed by a change in speed. A control of this type is described in more detail in U.S. Letters Patent 2,890,877 to Straznickas, dated June 2, 1959.

Turning now to a detailed description of the hydraulic valve 52, the purpose of the valve is first to selectively port fluid to and from a servomotor in a transmission of the type described above in the normal operating speed range of the transmission. For this purpose, the support member 60 is provided with a fluid pressure passage 130 opening into bore 131 therein. The valve 52 has a stationary sleeve valve member 133 within a milled longitudinal flat or groove thereon defining a fluid pressure passage 134 in continuous communication with the passage 130. The passage 130 is adapted to be connected to a suitable source of hydraulic fluid under pressure, such as a gear pump. The fluid pressure passage 134 continuously communicates with fluid pressure ports 135 and 136 in the rotating sleeve valve member 67. Each of the ports 135 and 136 consists of an annular recess in the outer periphery of the rotary valve member 67 which communicates with diametral radial passages extending from the recess to the interior of the valve member 67.

The stationary sleeve member 133 has another milled flat portion defining a drain passage 140 which is adapted to be connected through a suitable passage in support member 60 to a tank (not shown). The passage 140 communicates with a drain port 142 in the rotary valve member 67 through a radial passage 145 as shown in FIG. 6. The drain port 142 consists of an annular recess 144 in the outer periphery of rotary valve member 67 and diametral radial passages 145 which communicate with the annular recess 144 and the interior of valve member 67.

Referring to FIGS. 1 and 7, the servomotor control port 58 is formed in the rotary valve member 67 between the fluid pressure port 136 and the drain port 142 and includes an annular recess 150 in valve member 67 communicating with radial passages 151 which communicate with the interior of the valve member 67. The recess 150 is in continuous communication with a servo control passage 153 in the stationary valve member 133 adapted to be connected hydraulically to one side of a servomotor in a transmission of the type described.

The spool valve 56 has an annular recess 55 defining a passage adapted to connect the servomotor control port 58 selectively with either the fluid pressure port 136 or the drain port 142. With the passage 55 in the position shown in FIG. 1, the servomotor port 58 is blocked from both the fluid pressure port and the drain port.

With the prime mover operating in the normal speed range and the transmission output shaft rotating at the desired constant speed, the flyweight assembly 53 maintains the spool valve 56 in the position shown in FIG. 1, blocking the flow of fluid through servo port 58 thereby to lock the transmission servomotor in position and maintain the transmission ratio at that time. If the transmission output shaft speed decreases within the normal speed range, the flyweights 92 and 93 will pivot inwardly permitting the spring 100 to move the spool valve 56 down slightly so that passage 55 connects the fluid pressure port 136 to the servomotor port 58 to increase the transmission ratio and increase the output speed of the transmission to the desired level. If, on the other hand, the output speed of the transmission increases above the desired level in the normal speed range, flyweights 92 and 93 through arms 98 will raise the spool valve 56 slightly and passage 55 will provide communication between the servomotor port 58 and the drain port 42 permitting fluid flow from the servomotor to decrease the drive ratio of the transmission and reduce the output speed back to the desired level.

As noted above, an alternator drive of the character described may employ a pressure switch for disconnecting the alternator from an electrical bus when the input speed to the transmission falls below the normal speed range. For this purpose, the pressure switch port 57 is provided, as shown in FIGS. 1 and 5. The pressure switch port 57 consists of an annular recess 158 in the outer periphery of the rotary valve member 67 and radial passages 159 communicating therewith and with the interior of the valve member 67. The annular recess 158 is in constant communication with a pressure switch passage 160 in the stationary valve member 133 which is adapted to be connected to a suitable pressure switch. Another annular recess is provided in the outer periphery of the spool valve 56 defining a passage 161, as seen in FIG. 1. When the transmission is operating in the normal speed range, the flyweight mechanism 53 maintains communication between the fluid pressure port 135 and the pressure switch port 57 so that the associated pressure switch remains energized with the alternator delivering to the electrical bus.

In operation, if the flyweight assembly senses a speed indicating operation below the normal operating speed range, as may occur from a reduction in speed of the prime mover below the normal operating speed range, it may be impossible to maintain a constant output speed from the transmission. As the input speed of the transmission is reduced substantially below the rated minimum for the drive, a point is reached where the drive is no longer able to maintain the desired output speed. Under these conditions the transmission output to input ratio is at a maximum. The flyweight assembly is designed under these conditions to move the spool valve 56 down to the underspeed position shown in FIG. 8 under the influence of mainspring 100. At the underspeed position, the pressure switch port 57 is disconnected from the fluid pressure port 135 and connected to the drain port 142 permitting fluid flow from the pressure switch to tank. This is effective to disconnect the associated alternator from the tandem bus to prevent motoring of the alternator. Further, in the underspeed position, the servomotor port 58 remains in full communication with the fluid pressure port 136 to effect a maximum speed ratio in the transmission. In the underspeed position, therefore, the governor begins to shut down by porting the pressure switch port to drain but maintaining the servo control port pressurized so that the transmission still assumes the maximum drive ratio attempting to correct for the underspeed.

If the sensed speed is reduced further below the predetermined underspeed, as when the governor drive fails, the stop 111 will engage spring seat 106 and spring 101 will expand and begin to force the spool valve 106 downwardly a small distance to the failsafe position shown in FIG. 9. In this position, the pressure switch port 57 continues to drain fluid from the pressure switch through passage 161, and passage 55 disconnects the pressure port 136 from the servo control port 58. At the same time, the passage 161 connects the servomotor control port 58 to drain port 142, draining fluid from the servomotor and thereby shift the output to input speed ratio of the drive from maximum to minimum, minimizing the damage to the drive in the event a failure occurred in the governor drive mechanism. Further, in the absence of governor drive failure, the minimum drive ratio in the transmission is desired in this phase of start-up and shutdown to reduce wear on the transmission components.

In the failsafe position, the governor assembly is in the shutting down phase.

At sensed speeds below the failsafe speed, spring 101 continues to separate the shoulder 108 from the spring seat 106 moving the spool valve 56 toward its shutdown position shown in FIG. 10 which the valve assumes when the governor assembly 53 ceases rotating. In the shutdown position, the pressure switch port 57 and the servo control port 58 are in full communication with drain port 142 through passage 161 in spool valve 56. Note that at all speeds between failsafe and shutdown both the pressure switch port and the servo control are connected to the drain port. The spring 101 insures these conditions at all speeds below failsafe. If a single compression spring were employed, the failsafe speed would be undesirably high.

At shutdown, the fluid supply port 135 communicates with the interior 170 of the rotating flyweight assembly housing 77 through recess 171 in spool valve 56. On start-up, passage 171 is located to disconnect fluid pressure port 135 from the interior 170 at approximately the failsafe speed. The flow of supply oil to the interior 170 allows a quick fill thereof on start-up to reduce the time delay before governing begins at a predetermined higher speed.

During start-up, the governor 50 operates in substantially the reverse manner as that described above during shutdown. Briefly, as the prime mover starts rotation and the transmission begins coming up to speed, flyweights 92 and 93 begin to swing out from their shutdown position in FIG. 10 toward the failsafe position shown in FIG. 9. During this time, the pressure switch port and the servomotor port remain connected to drain port 142. As the transmission speed increases above the failsafe speed, servomotor port 58 is connected to fluid pressure port 136 placing the associated transmission in its maximum drive ratio position further increasing the output speed of the transmission. As the drive input and output speeds continue to increase, the governor valve 52 assumes the underspeed position shown in FIG. 8 and fluid pressure is ported to the pressure switch port 157 and the associated pressure switch is closed connecting the associated alternator to the bus bar. The prime mover speed then continues to increase, entering the normal operating speed range at which time the governor and drive are effective to maintain the desired output speed from the transmission.

I claim:

1. A governor for controlling fluid flow, comprising: a first valve member having a fluid pressure port, a return port, a first control port, and a second control port; a second valve member movable with respect to said first valve member; a flyweight assembly connected to move said second valve member, means for rotating said flyweight assembly, said second valve member being movable to a first position range by said flyweight assembly where the second port is selectively connectable to said fluid pressure port and said return port, said second valve member when in said first position also connecting said first control port to said fluid pressure port, and said second valve member being movable to a second position by said flyweight assembly where said first control port and said second control port are connected to said return port.

2. A governor as defined in claim 1, wherein said second valve member is movable to a third position by said flyweight assembly intermediate said first and second positions where said first control port communicates with said return port and said second control port communicates with said fluid pressure port.

3. A governor as defined in claim 2, wherein said second valve member is movable to a fourth shutdown position where the first control port and the second control port are maintained in communication with said drain port, said second valve member connecting said fluid pressure port with said flyweight assembly when in said shutdown position.

4. A governor for controlling fluid flow to a servomotor and a pressure switch in an alternator drive, comprising: a first valve member having a fluid pressure port, a drain port, a pressure switch port, and a servomotor control port; a second valve member slidable with respect to said first valve member and having first and second passages therein, a flyweight assembly connected to move said second valve member, means for rotating said flyweight assembly; said second valve member being movable to governing positions by said flyweight assembly in a predetermined normal speed range, said second passage selectivity connecting said servo port to said fluid pressure port and said drain port in said normal speed range, said first passage connecting said pressure switch port with said fluid pressure port throughout said normal speed range, said second valve member being movable to a failsafe position by said flyweight assembly at a predetermined speed below said normal speed range, said first passage connecting said pressure switch port and said servo port to said drain port at all speeds below said failsafe speed.

5. A governor as defined in claim 4 wherein, said second valve member is movable to an underspeed position intermediate said governing and failsafe positions at a speed below said normal speed range and above said failsafe speed, said first passage connecting said pressure switch port to said drain port at said underspeed position, and said second passage connecting said servo port to said fluid pressure port of said underspeed position.

6. A governor as defined in claim 5 wherein said second valve member is movable to a shutdown position by said flyweight assembly when the assembly ceases rotation when said first passage provides full communication between said pressure switch port and said drain port, and between said servo port and said rain port when in the shutdown position; and a third passage in said second valve member, said third passage connecting said fluid pressure port and said flyweight assembly in said shutdown position.

7. A governor for controlling a hydraulic transmission having a pressure switch for electrically connecting an alternator as a load and having a servomotor for varying the transmission ratio, comprising: a stationary valve member having a fluid pressure port, a drain port, a pressure switch port, and a servomotor port; a rotatable sleeve valve member mounted within said stationary valve member and having ports corresponding to and continuously communicating with said stationary valve ports, means for rotating said sleeve valve member, an axially movable spool valve member mounted within said rotary valve; a flyweight assembly for controlling said valve members including a cup-like member connected for rotation with said rotary valve member, flyweights pivotally mounted in said cup-like member and having arms for moving said spool valve in a first direction in response to an increase in speed of the sleeve valve member, a main spring urging said spool valve in a second direction in opposition to said flyweights at speeds above a predetermined failsafe speed, a second spring urging said spool valve in said second direction toward a shutdown position at speeds below said failsafe speed; said spool valve having a first annular recess for connecting said pressure switch port to said fluid pressure port in a predetermined normal speed range, said spool valve having a second annular recess adapted to selectively connect said servo port with said fluid pressure port and with said drain port in the normal speed range, said spool valve being movable to a failsafe position by said flyweight assembly at a failsafe speed a predetermined value below said normal speed range, said first recess being adapted to connect said servomotor port and said pressure switch port to drain at speeds below said failsafe speed.

8. A governor as defined in claim 7, wherein said spool valve is movable to an underspeed position intermediate the normal and failsafe positions; said first recess disconnecting said pressure switch from said fluid pressure port and connecting said drain port thereto at said underspeed position, and said second recess connecting said servomotor port to said fluid pressure port in said underspeed position.

9. A governor as defined in claim 8, wherein said spool valve is movable to a shutdown position in said other direction from said failsafe position when the flyweights cease rotation; said first recess maintaining and providing full communication between said pressure switch port and said drain port, and said servomotor port and said drain port in said shutdown position; a third annular recess in said spool valve member, said third recess connecting said fluid pressure port to said cup member whereby the cup member may be filled facilitating startup.

10. A governor for controlling a hydraulic transmission driving an alternator having a hydraulic servomotor for varying the speed ratio thereof and a pressure switch for connecting the alternator, comprising; a stationary valve member having a fluid pressure port, a drain port, a pressure switch port, and a servomotor port, a rotary sleeve valve member mounted within said stationary valve member and having ports corresponding to and continuously communicating with said stationary valve ports, means for rotating said sleeve valve member, an axially slidable spool valve member mounted within said rotary valve; a flyweight assembly for controlling said valve members including a cup-like member connected for rotation with said rotary valve member, flyweights pivotally mounted in said cup-like member and having arms for moving said spool valve in a first direction in response to an increase in speed of the sleeve valve member, a main spring urging said spool valve in a second direction in opposition to said flyweights at speeds above a predetermined failsafe speed, a speed spring urging said spool valve in said second direction toward a shutdown position at speeds below said failsafe speed; said spool valve having a first annular recess adapted to selectively connect said servo port with said pressure port and said drain port in a predetermined normal speed range, said spool valve having a second annular recess spaced from said first recess for connecting said pressure switch port to said fluid pressure port in said normal speed range, said spool valve being movable to an underspeed position by said flyweight assembly at a predetermined underspeed below said normal speed range, said second recess being adapted to connect said pressure switch port to said drain port at said underspeed, said spool valve being movable to a failsafe position by said flyweight assembly at a failsafe speed a predetermined value below said underspeed, said second recess being adapted to connect said servomotor port to drain and maintain said pressure switch port in communication with said drain port at speeds below said failsafe speed, said spool being movable to shutdown position by said flyweight assembly when said sleeve valve ceases rotation, said second recess being adapted to maintain said servo port and said pressure switch port in communication with said drain port when the spool valve is in the shutdown position, and a third recess in said spool valve spaced from said first and second recesses and adapted to connect said fluid pressure port with the interior of the flyweight assembly cup-like member to reduce the delay time of the governor during startup.

References Cited
UNITED STATES PATENTS

| | | | |
|---|---|---|---|
| 2,636,566 | 4/1953 | Jedrziewski | 137—54 X |
| 2,888,806 | 6/1959 | Teumer | 60—53 |
| 2,890,877 | 6/1959 | Straznickas | 73—518 |
| 2,931,117 | 4/1960 | Teumer | 60—53 |

CLARENCE R. GORDON, *Primary Examiner.*

UNITED STATES PATENT OFFICE
CERTIFICATE OF CORRECTION

Patent No. 3,370,600                                                  February 27, 1968

Robert S. Peterson

It is certified that error appears in the above identified patent and that said Letters Patent are hereby corrected as shown below:

In the heading to the printed specification, line 6, "a corporation of Illinois" should read -- a corporation of Delaware --.

Signed and sealed this 10th day of March 1970.

(SEAL)
Attest:

Edward M. Fletcher, Jr.                              WILLIAM E. SCHUYLER, JR.
Attesting Officer                                                    Commissioner of Patents